United States Patent
Files et al.

(10) Patent No.: US 11,831,188 B2
(45) Date of Patent: Nov. 28, 2023

(54) MULTI-DEVICE CHARGING USING FLOATING TRANSMITTER COIL

(71) Applicant: DELL PRODUCTS, L.P., Round Rock, TX (US)

(72) Inventors: Jace W. Files, Round Rock, TX (US); Vinh Xuan Bui, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 482 days.

(21) Appl. No.: 17/004,574

(22) Filed: Aug. 27, 2020

(65) Prior Publication Data

US 2020/0395785 A1 Dec. 17, 2020

Related U.S. Application Data

(62) Division of application No. 15/426,741, filed on Feb. 7, 2017, now Pat. No. 10,804,724.

(51) Int. Cl.
*H02J 7/00* (2006.01)
*H02J 50/10* (2016.01)
*H02J 50/40* (2016.01)

(52) U.S. Cl.
CPC .......... *H02J 7/0044* (2013.01); *H02J 7/0013* (2013.01); *H02J 50/10* (2016.02); *H02J 50/40* (2016.02)

(58) Field of Classification Search
CPC ............................ H04B 17/318; H04B 5/0037; H04B 7/18517; H04B 5/0081; H04B 5/02; H04B 5/0093; H04B 1/3827; H04B 5/0075; H02J 50/12; H02J 50/80; H02J 50/10; H02J 50/90; H02J 7/0042; H02J 50/40; H02J 50/60; H02J 7/02; H02J 50/005; H02J 7/00034; H02J 7/025; H02J 50/402; H02J 50/70; H02J 50/27; H02J 7/00302; H02J 50/50; H02J 7/007192; H02J 7/0044; H02J 7/0047; H02J 7/342; H02J 2310/23; H02J 3/02; H02J 50/20; H02J 7/00309; H02J 7/0048; H02J 7/007182; H02J 2207/20; H02J 2310/22; H02J 2310/44; H02J 2310/48; H02J 7/00045; H02J 7/0013;
(Continued)

(56) References Cited

U.S. PATENT DOCUMENTS 10,110,042 B2  10/2018  Sultenfuss et al.
2011/0127951 A1  6/2011  Walley et al.
(Continued)

OTHER PUBLICATIONS

"Dell Mobile Computing Cart," Dell Quick Reference Guide for Models ERGITD-001 and ERGITD-002, Mar. 2014, pp. 1-13, http://www.ergotron.com/Dell.
(Continued)

*Primary Examiner* — Binh C Tat
(74) *Attorney, Agent, or Firm* — Larson Newman, LLP

(57) ABSTRACT

A cart to store a plurality of mobile computing devices includes a plurality of slots defined by opposed plates. Each of the slots is configured to accept a corresponding mobile computing device. A first slot is defined by first and second plates, and a second slot is defined by the second plate and a third plate. The second plate includes a first transmit coil for wirelessly transmitting power to a first receive coil in a first mobile computing device within the first slot, and to a second receive coil in a second mobile computing device within the second slot.

20 Claims, 4 Drawing Sheets

(58) Field of Classification Search
CPC ........ H02J 7/0045; H02J 7/0049; H02J 7/005;
H02J 7/007188; H02J 7/35; H02J
7/00304; H02J 7/00; H02J 2310/40; H02J
7/04; H02J 2300/28; H02J 7/34; H02J
50/05; H02J 50/502; H02J 50/30; H02J
7/0029; H02J 50/15; H02J 7/00714; H02J
3/322; H02J 2207/40; H02J 2300/24;
H02J 50/23; H02J 50/00; H02J 7/00712;
H04L 9/3278; G08C 17/00
USPC .................................................. 320/106–115
See application file for complete search history.

(56) References Cited

U.S. PATENT DOCUMENTS

| 2011/0136550 | A1 | 6/2011 | Maugars | |
| 2015/0042269 | A1* | 2/2015 | Koren | H02J 50/10 |
| | | | | 320/108 |
| 2015/0188322 | A1* | 7/2015 | Lee | H02J 50/402 |
| | | | | 307/104 |
| 2015/0227127 | A1 | 8/2015 | Miller et al. | |
| 2015/0326060 | A1 | 11/2015 | Young | |
| 2016/0059723 | A1* | 3/2016 | Kim | B60L 53/39 |
| | | | | 320/108 |
| 2016/0285278 | A1* | 9/2016 | Mehas | H02J 50/12 |

OTHER PUBLICATIONS

"Dell Mobile Computing Cart-Managed (with Docking) Docking solution for Dell Latitude 3340," Dell Quick Reference Guide, Mar. 2014, pp. 1-10, http://www.ergotron.com/Dell.

"Dell Mobile Computing Cart," Dell Quick Reference Guide for Models ERGITD-001 and ERGITD-002 Rev. B, Oct. 2013, pp. 1-13, http://www.ergotron.com/Dell.

* cited by examiner

MULTI-DEVICE CHARGING USING FLOATING TRANSMITTER COIL

CROSS-REFERENCE TO RELATED APPLICATION

This application is a Divisional of U.S. patent application Ser. No. 15/426,741 entitled "Multi-Device Charging using Floating Transmitter Coil," filed on Feb. 7, 2017, the disclosure of which is hereby expressly incorporated by reference in its entirety.

FIELD OF THE DISCLOSURE

The present disclosure generally relates to information handling systems, and more particularly relates to wireless power for information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A cart to store a mobile computing devices includes a plurality of slots defined by opposed plates. Each of the slots may accept a corresponding mobile computing device. A first slot is defined by first and second plates, and a second slot is defined by the second plate and a third plate. The second plate includes a first transmit coil to wirelessly transmit power to a first receive coil in a first mobile computing device within the first slot, and to a second receive coil in a second mobile computing device within the second slot.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
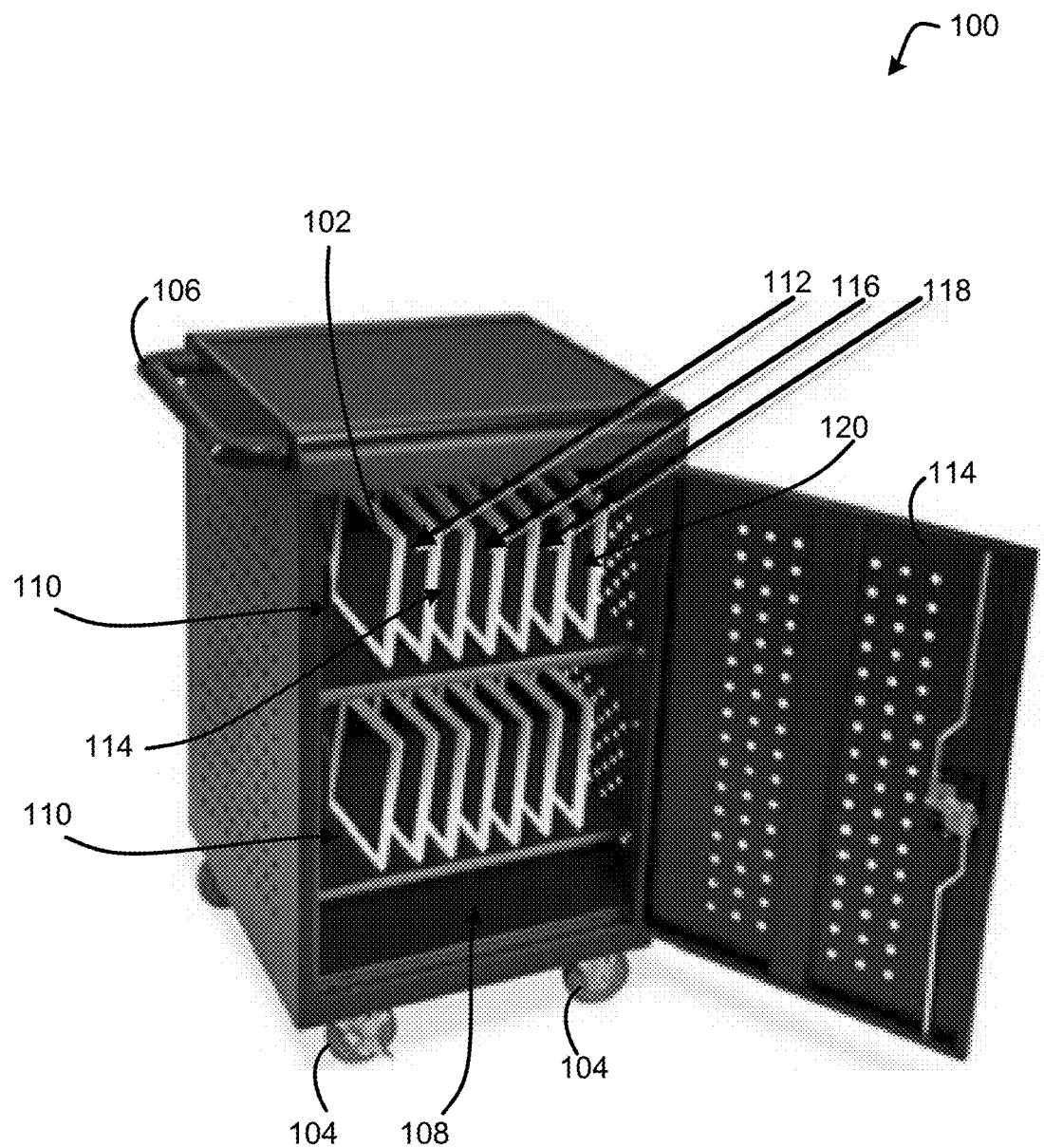
FIG. 1 is a diagram illustrating a cart for wirelessly recharging mobile computing devices according to at least one embodiment of the present disclosure.

FIG. 1 shows a cart 100 to wirelessly recharge information handling systems such as mobile computing devices 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The cart 100 includes wheels 104, one or more handles 106, a compartment 108, rows 110, multiple slots 112, 114, 116, 118, and 120 that are configured to receive the mobile computing devices 102, and a door 114. In an embodiment, the door 114 can include a lock, such that after the mobile computing devices 102 are placed within the slots 112, 114, 116, 118, and 120 the compartment 108 can be locked to securely hold the mobile computing devices.

The cart 100 may be connected to a network, such as a local area network or a cellular network, either by wire or wirelessly. The slots 112, 114, 116, 118, and 120 in turn may be provided with wired Ethernet connections (not shown) that mate with corresponding Ethernet ports on the mobile computing devices. Alternatively the cart 100 may be provided with a wireless access point. Any of these configurations allow for network management of the mobile computing devices 102, such as the provision of software updates.

Figure 2:
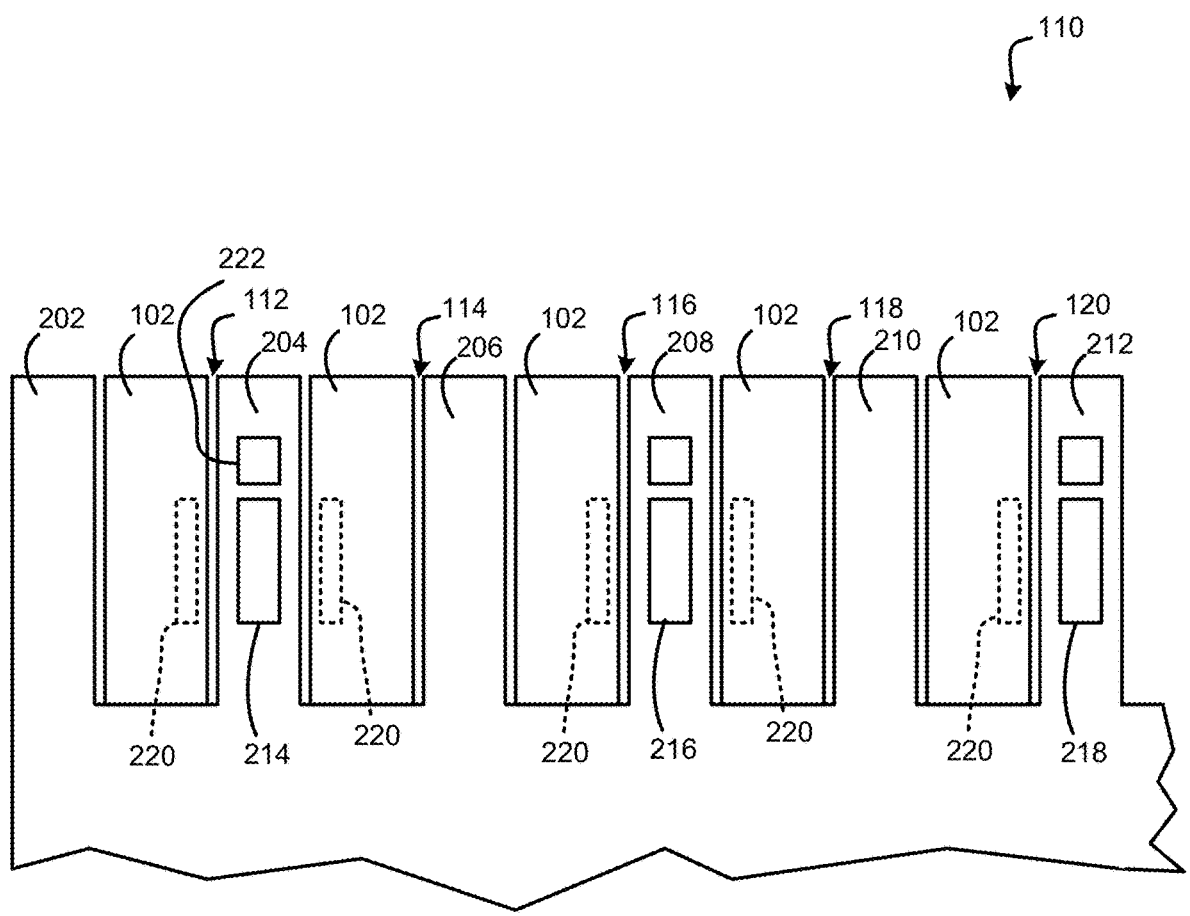
FIG. 2 is a diagram illustrating a row of slots within the cart according to at least one embodiment of the present disclosure.

FIG. 2 shows an embodiment of a single row 110 of the cart 100 of FIG. 1. In an embodiment, the slots 112, 114, 116, 118, and 120 are created or defined by two opposing plates. For example, slot 112 is defined by plates 202 and 204, slot 114 is defined by plates 204 and 206, slot 116 is defined by plates 206 and 208, slot 118 is defined by plates 126 and 128, and slot 120 is defined by plates 128 and 130.

In an embodiment, every other plate includes a transmit coil 214, 216, and 218. For example, plate 204 includes a transmit coil 214, plate 208 includes a transmit coil 216, and plate 212 includes a transmit coil 218, and plates 202, 206, and 210 do not include a transmit coil. The transmit coils 214, 216, and 218 are omni-direction or dual sided coils, such that each transmit coil can wirelessly provide power to one or two receive coils 220 of the mobile computing device 102 at the same time. For example, the transmit coil 214 can provide power to the receive coil 220 of the mobile computing device 102 located within slot 112 while also providing power to the receive coil 220 of the mobile computing device 102 located within the slot 114. Similarly, the transmit coil 216 can provide power to the receive coil 220 of the mobile computing device 102 located within slot 116 while also providing power to the receive coil 220 of the mobile computing device 102 located within the slot 118. The transmit coil 218 can provide power to the receive coil 220 of the mobile computing device 102 located within slot 120.

In an embodiment, the receive coils 220 should be no more than 50-60 mm from one of the transmit coils 214, 216, and 218 so that the receive coils 220 can receive a proper power level to charge the associated mobile computing device 102. Therefore, the orientation of the mobile computing devices 102 should be in a manner than places a receive coil 220 nearest to a plate with a transmit coil. In an embodiment, the plates 204, 208, and 212 that include respective transmit coils 214, 216, and 218 can be marked to indicate the locations of the transmit coils to a user. For example, each of the plates 204, 208, and 212 can include a sticker or marker 222 to indicate that these plates include a transmit coil 214, 216, or 218.

In an embodiment, the transmit coils 214, 216, and 218 wirelessly transmit power in a particular direction after detected a receive coil 220 in that direction. Therefore, transmit coil 214 provides power into slot 112 after a receiver coil 220 is detected within the slot 112. Similarly, the transmit coil 214 provides power into slot 114 after a receiver coil 220 is detected within the slot 114.

In an embodiment, the transmit coils 214, 216, and 218 operate at higher efficiency when a transmit coil 214, 216, or 218 provides power to only a single receive coil 220 as compared when a transmit coil 214, 216, or 218 provides power to two receive coils 220. Therefore, in the configuration illustrated in FIG. 2, the transmit coil 218 operates at a higher efficiency than transmit coils 214 and 216. In an embodiment, the transmit coils 214, 216, and 218 can be wirelessly transmit the power through a resistant charging technique. In an embodiment, the plates 202, 204, 206, 208, 210, and 212 are preferably plastic, and impregnated with iron or provided with iron inserts sufficient to magnetically isolate the transmit coils on each plate.

Thus, the dual sided transmit coils 214, 216, and 218 enable the cart 100 to wirelessly charge a same number of mobile computing devices 102 but with half the number of transmit coils as a cart with single sided transmit coils. Additional, the dual sided transmit coils 214, 216, and 218 enable multiple device to be charged by a single transmit coil that is smaller and more efficient than a single sided transmit coil that can wireless transmit power to multiple receive coils.

Figure 3:
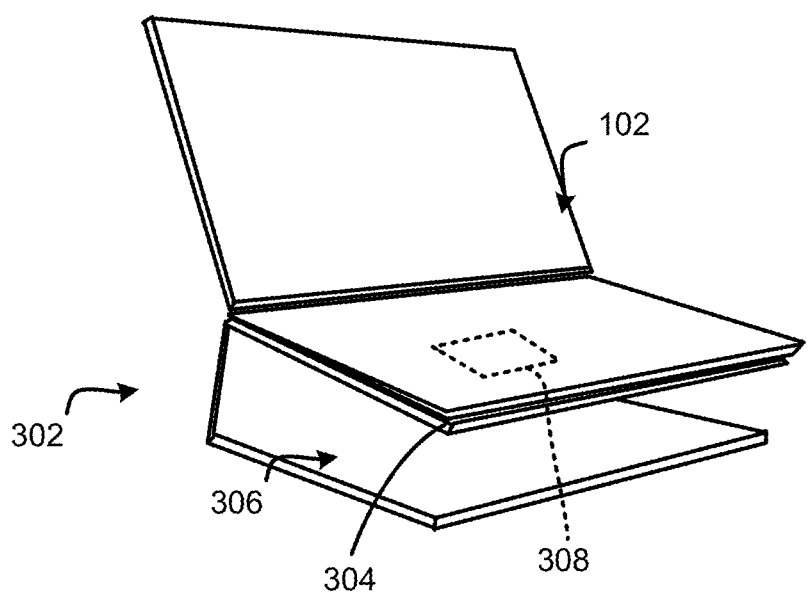
FIG. 3 is a diagram illustrating a charging stand according to at least one embodiment of the present disclosure.

FIG. 3 illustrates a charging stand 302 including a floating charging pad 304 and a tray 306 according to at least one embodiment of the present disclosure. The floating charging pad 304 includes a transmit coil 308 to wirelessly transmit power a receive coil within the mobile computing device 102 located on top of the floating charging pad 304, and to a receive coil of a mobile computing device located on the tray 306 below the transmit coil 308.

The transmit coil 308 is an omni-direction or dual sided coil, such that the transmit coil 308 can wirelessly provide power to one or two receive coils of mobile computing devices at the same time. In an embodiment, the transmit coil 308 can operate in substantially the same manner as the transmit coils 214, 216, and 218 of FIG. 2, such that a receive coil is needed as a termination point before power is transmitted in a particular direction. Additionally, transmit coil 308 provides a uniform flux to enable the transmit coil to be more efficient than a transmit coil that does not provide a uniform flux. In an embodiment, the transmit coil 308 transmits power in a direction after a receive coil is close enough to the transmit coil 308 to be a termination point for the magnetic field of the transmit coil 308. In an embodiment, the distance that the receive coil can be from the transmit coil 308 can be no greater than 50-60 mm. Therefore, the orientation of a receive coil with respect to the transmit coil 308 is important to provide proper wireless charging of a mobile computing device.

Figure 4:
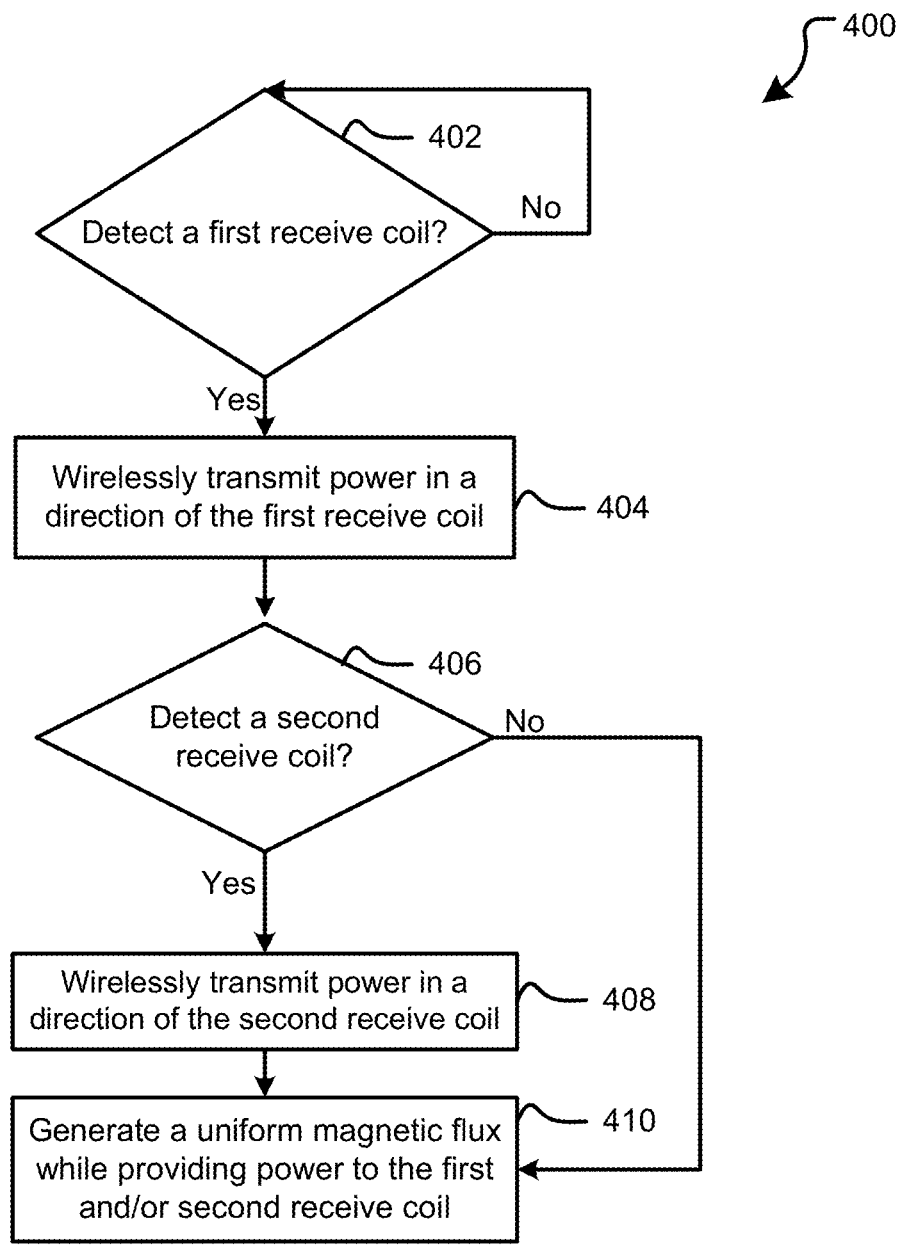
FIG. 4 is a flow diagram illustrating a method for charging multiple devices with a single transmit coil according to at least one embodiment of the present disclosure.

FIG. 4 illustrates a flow diagram of a method 400 for charging multiple devices with a single transmit coil according to at least embodiment of the present disclosure. At block 402, a determination is made whether a first receive coil is detected. In an embodiment, the first receive coil can be detected by the first receive coil being located within a magnetic field of a transmit coil. When the first receive coil is detected, power is wirelessly transmitted by the transmit coil in a direction of the first receive coil at block 404.

At block 406, a determination is made whether a second receive coil is detected. If the second receive coil is not detected, the flow continues at block 410. Otherwise, if the second receive coil is detected, power is wirelessly transmitted by the transmit coil in a direction of the second receive coil at block 408. At block 410, a uniform flux is generated while power is being wirelessly transmitted to the first and/or second receive coil.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A charging stand to store first and second mobile computing devices, the charging stand comprising:
    a floating charging pad; and
    a transmit coil disposed within the floating charging pad, the transmit coil to wirelessly transmit power to a first receive coil in the first mobile computing device located above the floating charging pad, and to a second receive coil in the second mobile computing device located below the floating charging pad, wherein the transmit coil being a dual sided coil, and wherein based on the transmit coil being a dual sided coil, the transmit coil wirelessly transmits power to the first receive coil and wirelessly transmits power to the second receive coil at the same time.

2. The charging stand of claim 1 wherein an efficiency of the transmit coil is greater if only the first receive coil or the second receive coil receive power from the transmit coil as compared to both the first receive coil and the second receive coil receiving power from the transmit coil at the same time.

3. The charging stand of claim 1 wherein the transmit coil generates a uniform flux while transmitting power to the first and second receive coils.

4. The charging stand of claim 1 wherein the transmit coil wirelessly transmits the power in a first direction in response to the first receive coil being a first termination point for the transmit coil.

5. The charging stand of claim 4 wherein the first receive coil is the first termination point for the transmit coil when the first receive coil is below a threshold distance from the transmit coil.

6. The charging stand of claim 1 wherein the transmit coil wirelessly transmits the power in a second direction in response to the second receive coil being a second termination point for the transmit coil.

7. The charging stand of claim 6 wherein the second receive coil is the second termination point for the transmit coil when the second receive coil is below a threshold distance from the transmit coil.

8. The charging stand of claim 1 wherein the transmit coil is an omni-direction coil.

9. A charging stand to store first and second mobile computing devices, the charging stand comprising:
    a floating charging pad; and
    a transmit coil disposed within the floating charging pad, the transmit coil being a dual sided coil, the transmit coil to wirelessly transmit power in a first direction to a first receive coil in the first mobile computing device in response to the first receive coil being a first termination point for the transmit coil, wherein the first mobile computing device is located above the floating charging pad, and to wirelessly transmit power in a second direction in response to a second receive coil in a second mobile computing device being a second termination point for the transmit coil, wherein the second mobile computing device is located below the floating charging pad, wherein the transmit coil wirelessly transmits power to the first receive coil and wirelessly transmits power to the second receive coil at the same time.

10. The charging stand of claim 9 wherein an efficiency of the transmit coil is greater if only the first receive coil or the second receive coil receive power from the transmit coil as compared to both the first receive coil and the second receive coil receiving power from the transmit coil at the same time.

11. The charging stand of claim 9 wherein the transmit coil generates a uniform flux while transmitting power to the first and second receive coils.

12. The charging stand of claim 9 wherein the first receive coil is the first termination point for the transmit coil when the first receive coil is below a threshold distance from the transmit coil.

13. The charging stand of claim 9 wherein the second receive coil is the second termination point for the transmit coil when the second receive coil is below a threshold distance from the transmit coil.

14. The charging stand of claim 9 wherein the transmit coil is an omni-direction coil.

15. A method comprising:
wirelessly transmitting, by a transmit coil of a floating pad in a charging stand, power to a first receive coil of a first mobile computing device located above the floating charging pad; and
wirelessly transmitting, by the transmit coil, power to a second receive coil of a second mobile computing device while wirelessly transmitting power to the first receive coil in response to the second receive coil being a second termination point for the first transmit coil, wherein the second mobile computing device is located below the floating charging pad, wherein the transmit coil is a dual sided coil, and wherein based on the transmit coil being a dual sided coil, the transmit coil wirelessly transmits power to the first receive coil and wirelessly transmits power to the second receive coil at the same time.

16. The method of claim 15 further comprising:
generating a uniform flux while transmitting power to the first and second receive coils.

17. The method of claim 15 wherein an efficiency of the transmit coil is greater if only the first receive coil or the second receive coil receive power from the transmit coil as compared to both the first receive coil and the second receive coil receiving power from the transmit coil at the same time.

18. The method of claim 15 further comprising:
transmitting, by the transmit coil, the power in a first direction in response to the first receive coil being a first termination point for the transmit coil.

19. The method of claim 15 further comprising:
transmitting, by the transmit coil, the power in a second direction in response to the second receive coil being a first termination point for the transmit coil.

20. The method of claim 15 wherein the transmit coil is an omni-direction coil.

* * * * *